Oct. 12, 1948.  J. M. BRIAN  2,451,150
RADIO REMOTE CONTROL SYSTEM
Filed Oct. 28, 1944  4 Sheets-Sheet 1

INVENTOR.
JOSEPH M. BRIAN
BY D.J. Bonett
ATTORNEY

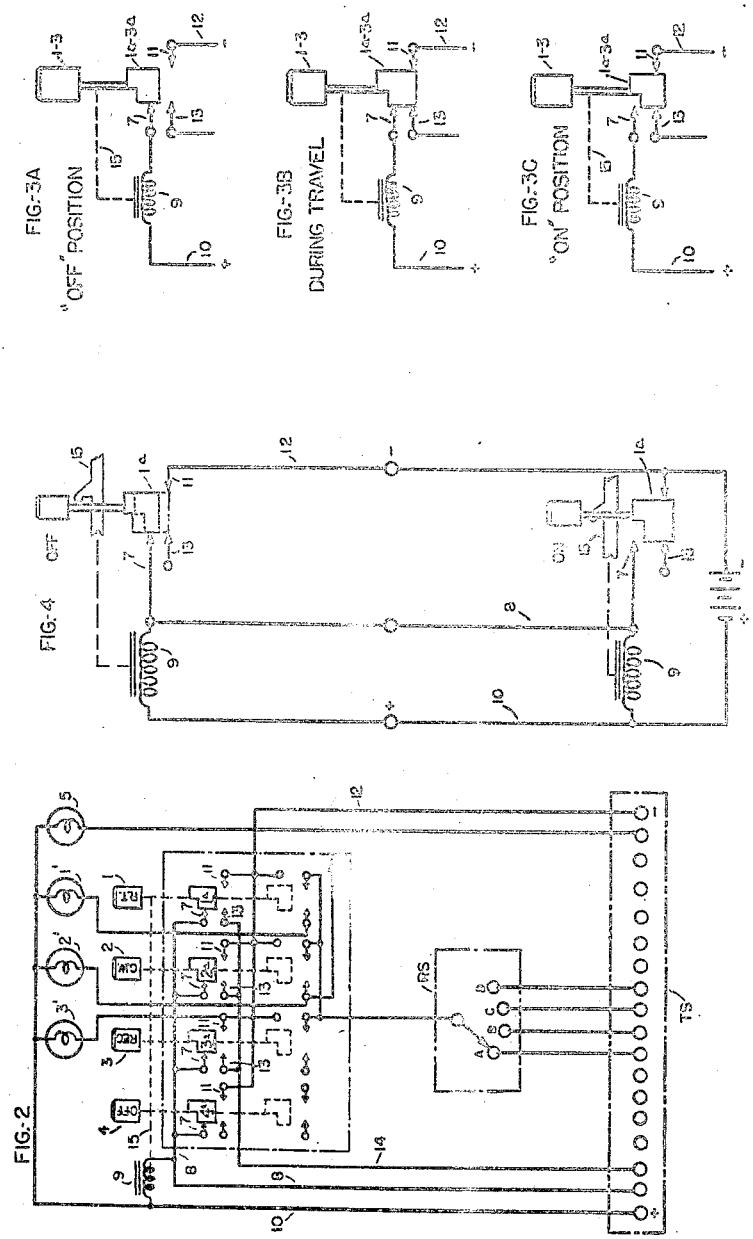

Oct. 12, 1948.  J. M. BRIAN  2,451,150
RADIO REMOTE CONTROL SYSTEM
Filed Oct. 28, 1944  4 Sheets-Sheet 3
Fig.-5
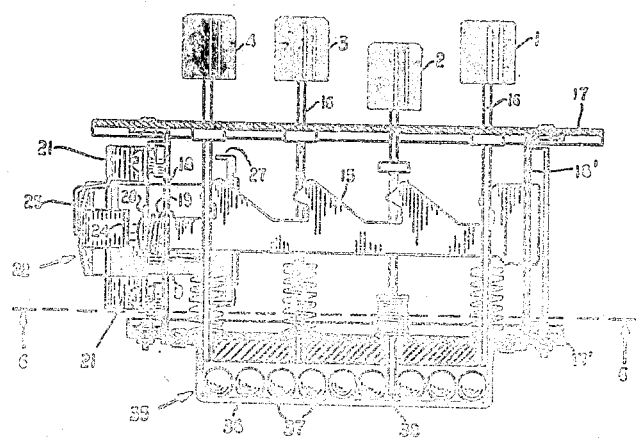
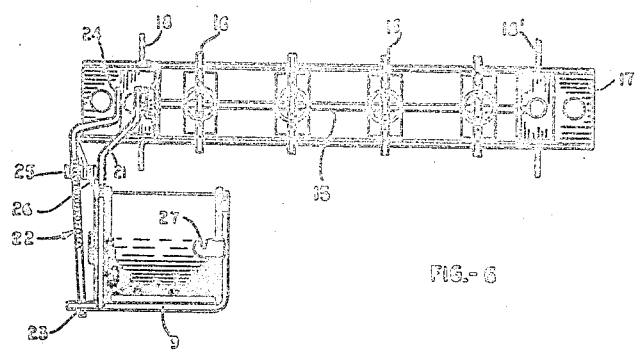
Fig.-6
INVENTOR.
JOSEPH M. BRIAN
BY
ATTORNEY Oct. 12, 1948.  J. M. BRIAN  2,451,150
RADIO REMOTE CONTROL SYSTEM
Filed Oct. 28, 1944  4 Sheets-Sheet 4
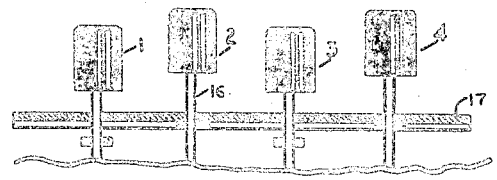
FIG.-7
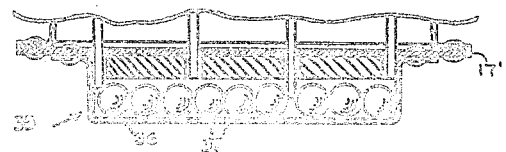
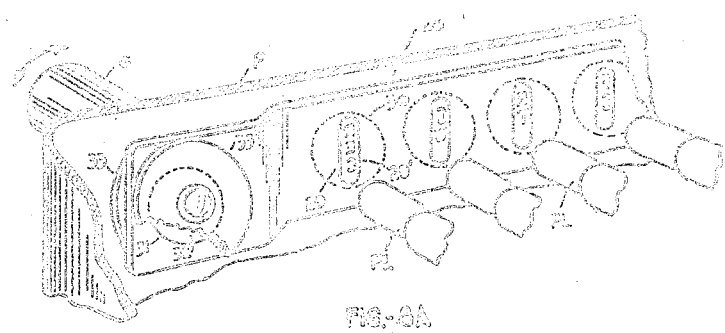
FIG.-8A
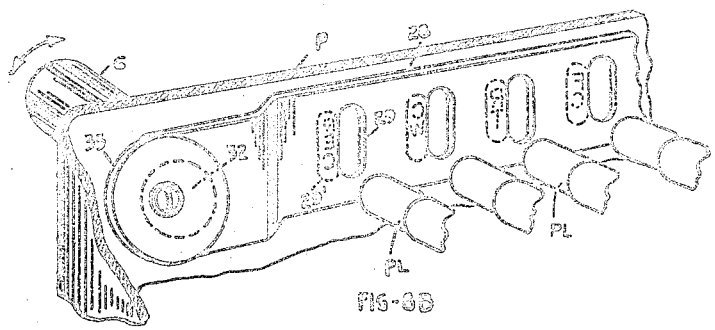
FIG.-8B
INVENTOR.
JOSEPH M. BRIAN
BY
ATTORNEY Patented Oct. 12, 1948

2,451,150

UNITED STATES PATENT OFFICE 2,451,150

RADIO REMOTE-CONTROL SYSTEM

Joseph M. Brian, Westmount, Quebec, Canada, assignor, by mesne assignments, to Radio Corporation of America, New York, N. Y., a corporation of Delaware Application October 28, 1944, Serial No. 560,820
In Canada June 2, 1944

4 Claims. (Cl. 175—320)

The present invention relates to a remote control system for radio apparatus, and more particularly to a system of control wherein such apparatus is adapted to be controlled from any one of a plurality of control points or stations.

While in general the invention will find utility in the remote control of receivers, transmitters and related radio apparatus, for illustrative purposes, the present invention will be shown and described in connection with a transmitter-receiver adapted for use in aircraft. In installations of this kind there are usually provided several types of emission or facilities, such as continuous waves (CW), reception (REC), and radio telephone, two-way communication (RT). It is desirable also that the transmitter-receiver be capable of selective control from a plurality of stations or locations. By way of example, each of four stations in a plane may be manned by a radio operator, a pilot, a co-pilot, and an observer, and each would be provided with a controller or control box connected by a cable, through one or more junction boxes, to the transmitter-receiver proper which would then be under the complete control of the personnel at any one of the remote stations.

It is, therefore, one of the objects of the invention to provide a system of remote control which will permit any crew member stationed at any one of a plurality of control boxes to select a desired radio facility, such as transmit, receive or CW, irrespective of what radio facility that may have been previously selected by another crew member at a different control box.

Another object of the invention is to provide a mechanical interlock of relatively simple construction whereby only a single push-button is capable of being actuated at any one time to preclude the accidental actuation of two or more push-buttons simultaneously.

A further object of the invention is to provide a system of panel indicating lights arranged for a minimum of glare to indicate at each of the control boxes the facility that is currently being employed.

A still further object is to provide a dimmer control at each control box to permit a continuous range of intensity from full "on" for daytime operation to full "off" for night operation The novel features characteristic of my invention are set forth with particularity in the appended claims. The invention itself, however, as to both its organization and mode of operation together with further objects and advantages thereof, will be best understood by reference to the following description taken in connection with the accompanying drawing, in which:

Fig. 2 is a wiring diagram of one of the control boxes;

Figs. 3A to 3C show in diagrammatic fashion the relative arrangement of the fixed and movable push-button contacts at successive positions of a push-button when operated from "off" to "on";

Fig. 4 is a simplified wiring diagram to show the interconnections between two control boxes, and the manner of effecting operation of the push-button reset or release relay;

Fig. 5 is a plan view, partly in section, of the push-button assembly;

Fig. 6 is a view in cross-section taken along the line 6—6 in Fig. 5;

Fig. 7 is a view similar to Fig 5 showing the means for preventing actuation of more than one push-button at a time; and Figs. 8A and 8B are perspective views looking from the rear showing the construction of the dimmer control for the panel indicating lights.

Figure 1:
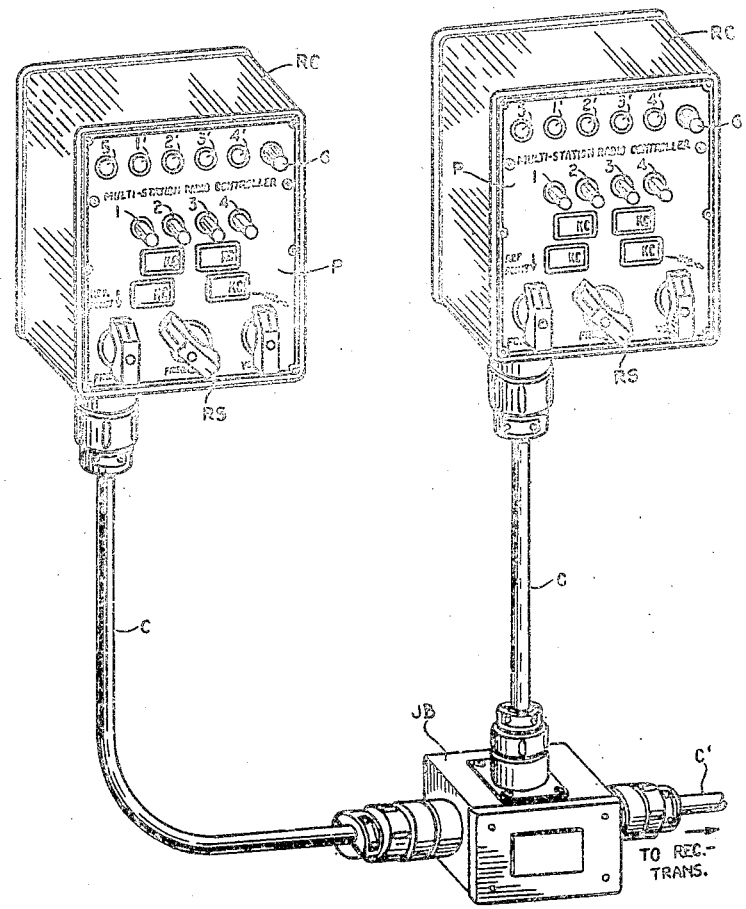
Fig. 1 is a perspective view of an installation utilizing two control boxes showing the external control elements.

Referring now to Fig. 1, RC and RC are a pair of multi-station radio controllers or control boxes, of identical construction, each connected by a cable C to a junction box JC which in turn is connected by way of a cable C' to the transmitter-receiver, not shown. For illustrative purposes, only two controllers are shown, but it will be understood that any desired number may be used depending upon requirements, by providing additional junction boxes and having the several controllers connected in parallel.

Each controller is provided with a front panel P through which there extends four push-buttons, 1 to 4, for effecting operation of the equipment. Above and in line with the respective push-buttons are four viewing windows 1' to 4', only 1' to 3' of which are illuminated by pilot lights positioned to the rear thereof for indicating the type of emission or facility currently in use. Thus, push-button 1 provides RT or radio telephone operation, push-button 2 provides CW (continuous wave) operation and push-button 3 provides REC (receive) operation. Viewing window 4' is not illuminated, providing merely a marker for the "off" push-button 4. At 5 is the viewing window which is illuminated during the time the apparatus is changing frequency, reference thereto having been made in my application filed concurrently herewith, now Patent No. 2,413,211, issued December 24, 1946. At 6 is the dimmer control knob which will be referred to in greater detail later.

The controls shown at the lower part of the panel do not form a part of the present invention and need not be considered further, except to mention that the frequency selector control RS is utilized to select automatically one of four frequency channels A, B, C, and D, the mechanism for such automatic selection being disclosed and claimed in my above patent.

Fig. 2 represents schematically the wiring diagram of one of the controllers as seen from the rear. The several push-buttons are shown at 1—4 and correspond with those shown in Fig. 1. Associated with each of the push-buttons are a plurality of movable contacts, of which only those are shown in full lines that are necessary for an understanding of the present invention, and are designated 1a to 4a to correspond with the push-buttons with which they are associated. The movable contacts shown dotted and others that are not shown provide supplementary control functions with which the present invention is not concerned. For example, from certain of the fixed contacts associated with the three movable contacts at the right, shown dotted, a connection is made to the remote selector switch RS which is shown and described more fully in my patent mentioned above.

Associated with each of the movable contacts 1a to 4a is a separate fixed contact 7, the several being connected to a common lead 8 which is connected to one terminal of a magnetic release relay 9 and to also a terminal on a terminal strip TS, the other terminal of the relay being connected through a conductor 10 to the plus (+) terminal on the terminal strip. Also associated with each of the movable contacts 1a to 4a is a separate fixed contact 11, the several of which are connected together by way of a conductor 12 to the minus (—) terminal on TS.

A third fixed contact 13 is associated with each of the movable contacts, but only those associated with the movable contacts 1a, 2a and 3a are connected to a conductor 14, the contact 13 for the "off" push-button being unconnected or blank. The conductor 14 through another terminal on TS leads to the starting relay in the power supply for the transmitter-receiver equipment. The several pilot lights 1' to 3' and 5 each have one terminal connected to the conductor 10, the other terminals being suitably connected as shown.

The push-buttons 1 to 4 are provided with a sliding latch bar of known construction (see Fig. 5) which is represented in Fig. 2 by the dash line 15. The magnetic relay 9, upon being energized, is adapted to co-act with the latch bar to release any one of the push-buttons that may be in its depressed or "on" position. It is only necessary that the latch releasing relay be energized for a short interval, that is, momentarily. In order that this may be effected, the movable and fixed push-button contacts are suitably constructed and arranged relatively to one another as will appear from a consideration of Figs. 3A, 3B and 3C, which show, respectively, the "off" position, the position at which the relay is energized, and the "on" position for any one of the push-buttons 1 to 3.

In Fig. 3A the movable contact 1a—3a is positioned in contact with fixed contact 7, but out of contact with fixed contact 11. In Fig. 3B the contact 1a—3a is shown moved to the position where it contacts both 7 and 11. At this instant the circuit through the magnetic release relay 9 will be completed. The contact making position of Fig. 3B is only momentary during the push-button travel to its "on" position, whereat, as shown in Fig. 3C the contacts 7 and 11 are broken to deenergize the relay. Contact between 11 and 13 is first made in Fig. 3B and is continued to be made in Fig. 3C to complete the starting relay circuit and certain other supplementary control circuits as mentioned previously.

In Fig. 4 there is disclosed a simplified circuit diagram of a pair of controllers in order to explain the operation of the release relay. The push-button in the lower control box is shown to have been actuated to "on." In this position the latch bar 15 holds the push-button in its actuated or "on" position in a known manner. Should it now be desired, at the upper control box, to supersede the control of the equipment effected by the lower control box, it is only necessary to actuate any one of four push-buttons of the upper control box. At the instant when the actuated push-button causes momentary contact to be made, as explained in connection with Fig. 3B, a circuit will be completed through the release relay, in the upper control box as follows: from the + side of the source, conductor 10, upper relay 9, contact 7, contact 1a shown dotted, contact 11, conductor 12, and back to the — side of the source. By means of the common conductor 8, the lower release relay is connected in parallel with the upper relay and will also be energized. As a result the latch bar in the lower control box will be released.

The details of construction of the push-button assembly and the mounting of the magnetic latch-releasing relay are shown in Figs. 5 and 6. The plungers 16 of the several push-buttons are adapted to be reciprocated within aligned slots formed in a pair of transverse frame members 17, 17' which are held in parallel spaced relation by a pair of side members 18, 18'. The latch bar 15 extends through suitably formed aligned slots in the side members and in the push-button plungers, the end of the bar that extends through the side member 18 at the left having a spring 19 which is retained between a washer 20 and the side frame 18 for the purpose of urging the latch bar toward the left. The push-button plungers and the latch bar are of known, conventional construction, in which any one of the push-buttons upon actuation co-acts with the latch bar to urge it to the right in Fig. 5, in opposition to the spring 19, to thereby permit the release of a previously actuated push-button plunger.

The magnetic release relay 9, previously mentioned, is utilized for accomplishing the same result electrically from a remote point. The relay is shown mounted underneath the push-button assembly by means of a pair of arms 21 attached to the side frame 18. The relay armature is shown at 22, and is pivoted at its lower end 23. At the upper end the armature is provided with a latch-bar actuating part 24 which is aligned with the protruding end of the latch bar. Formed integrally with one of the relay support arms 21 is a stop member 25 which serves to limit the position of the armature to the left or inoperative position, a leaf spring 26 being provided to urge the armature to that position. Upon completing the circuit for the relay, as described previously, the armature 22 will be moved to the right in opposition to spring 26, the actuating part 24 striking the latch bar at the left end to release an actuated push-button. With the opening of the relay circuit the armature will be returned against the stop 25 by the leaf spring 26. At 27 is shown one of the terminals for the relay.

In order that more than one push-button may not be permitted to be actuated at the same time, a mechanical interlock device for the push-button plungers, shown generally at 35, is utilized. The interlock comprises a narrow, channel-shaped container 36 attached to the lower frame member 17' and into which the terminal portions of the several plungers are adapted to enter.

Located within the container are a plurality of ball-bearings 37 so dimensioned that sufficient clearance (shown at 38) is provided to permit the end of only one of the push-button plungers to enter between a pair of ball-bearings, as will appear from Fig. 5. It will be clear, of course, that if two or more push-buttons are actuated the clearance will be insufficient to permit the full actuation of the several push-buttons as will appear from the view shown by Fig. 7.

Another feature of the invention is the use of a dimmer control for the indicating pilot lights PL which are positioned behind the viewing windows 1', 2' 3' and 5 in the front panel P of the control box. This enables varying degrees of light intensity to pass through the viewing windows, from full on to full off, so that the control may be utilized to encounter different operating conditions, as for day or night flying, etc.

The construction of the dimmer control is shown in Figs. 8A and 8B and involves the use of a transversely movable plate or shutter 28 directly behind the front panel and having apertures 29 which are similarly shaped as those 29' in masks 30 that are inserted into the viewing windows at the rear. In order to control the movement of the shutter plate it is provided at one end with an aperture 31 which is engaged by an eccentric cam 32 attached to the shaft of the dimmer control knob 6. A pair of discs 33, one on each side of the cam, serves to retain it within the shutter aperture. It will be clear therefore that rotation of the control knob causes relative movement of the shutter 28 with respect to the masked apertures in the viewing windows so that their openings may be varied to any desired extent.

In Fig. 8A the apertures in the viewing window masks are aligned or in registry with those of the shutter so that the maximum of light is permitted to pass through, whereas in Fig. 8B the shutter is shown to have been moved, so that the respective cooperating apertures are out of complete registry to thereby permit no light at all to pass through the windows. However, at intermediate positions of the shutter varying degrees of light are permitted.

While I have shown a particular embodiment of my invention, it will, of course, be understood that I do not wish to be limited thereto, since various modifications may be made both in the circuit arrangement, in the instrumentalities, and in the mechanical construction employed without departing from the spirit and scope of my invention as set forth in the appended claims, and I contemplate by the appended claims to cover any such modifications as fall within the true spirit and scope of my invention.

What I claim is:

1. In combination, a plurality of remote control devices for controlling the operation of radio apparatus from a plurality of remote points, each control device comprising a plurality of push-button operated switches, means associated with the several push-buttons at each control device whereby operation of a selected one of the push-buttons at any one of the control devices effects the release of a previously operated push-button at said one control device, and circuit means interconnecting the plurality of remote control devices whereby operation of said selected push-button at said one control device effects the release of a previously operated push-button that may have been operated at one of the other control devices without effecting anew the operation of any of the remaining push-buttons at any of the other control devices.

2. In combination, a plurality of remote control devices for controlling the operation of radio apparatus from a plurality of remote points, each control device comprising a plurality of push-button operated switches, mechanical means associated with the several push-buttons at each control device whereby operation of a selected one of the push-buttons at any of the control devices effects the release of a previously-operated push-button at said one control device, and circuit means interconnecting the plurality of remote control devices whereby operation of any one of the push-buttons at said selected push-button at said one control device operates the mechanical means at the other control boxes to effect the release of a previously-operated push-button that may have been operated at one of the other control devices, said selectively operated push-button being the only one to be operated to effect the operation of the radio apparatus.

3. In combination, a plurality of remote control devices for controlling the operation of radio apparatus from a plurality of remote points, each control device comprising a plurality of push-button operated switches, a latch bar associated with the several push-buttons at each of the control devices whereby operation of a selected one of said push-buttons at any one of the control devices effects the release of a previously-operated push-button at said one control device, and circuit means interconnecting the plurality of remote control devices whereby operation of said selected push-button at said one control device actuates the respective latch bars at the other control devices to effect the release of a previously-operated push-button that may have been operated at one of the other control devices, said selectively operated push-button being the only one to be operated to effect the operation of the radio apparatus.

4. The combination defined in claim 3 wherein the circuit means includes a plurality of electromagnetic relays, one in each of the control devices which are momentarily energized during the actuation of any push-button, to cause their respective armatures to co-act with their associated latch bars for releasing the previously-operated push-buttons.

JOSEPH M. BRIAN.

REFERENCES CITED

The following references are of record in the file of this patent:

UNITED STATES PATENTS

| Number | Name | Date |
|---|---|---|
| 1,972,985 | Gardner | Sept. 15, 1934 |
| 2,109,054 | Soreng et al. | Feb. 22, 1938 |
| 2,213,845 | Mastoney et al. | Sept. 3, 1940 |
| 2,276,607 | Bruns | Mar. 17, 1942 |
| 2,315,191 | Elliott | Mar. 30, 1943 |
| 2,322,563 | Bruno | June 22, 1943 |